(12) United States Patent
Rejman et al.

(10) Patent No.: US 7,816,888 B2
(45) Date of Patent: *Oct. 19, 2010

(54) BATTERY PACK LOCKABLE WITH A CORDLESS POWER TOOL

(75) Inventors: Marcin Rejman, Waiblingen (DE); Wolf Matthias, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/410,882

(22) Filed: Mar. 25, 2009

(65) Prior Publication Data

US 2009/0180829 A1 Jul. 16, 2009

(51) Int. Cl.
*H02J 7/00* (2006.01)
(52) U.S. Cl. .................... 320/114; 320/112; 403/107; 403/321; 403/326; 403/331
(58) Field of Classification Search ............ 403/106, 403/107, 321, 322.1, 325, 326, 328, 331, 403/353; 320/112, 114
See application file for complete search history.

(56) References Cited

U.S. PATENT DOCUMENTS 3,587,341 A * 6/1971 Fiddler ...................... 403/326
3,710,645 A * 1/1973 Bennett ...................... 403/107
4,146,682 A * 3/1979 Nakao .......................... 429/97
4,309,067 A * 1/1982 Riley, Jr. ..................... 439/347
5,251,105 A * 10/1993 Kobayashi et al. .......... 320/112
5,484,223 A * 1/1996 Saito .......................... 403/326
5,621,618 A * 4/1997 Komiyama ................. 361/732
7,001,209 B2 * 2/2006 Ebine ......................... 439/500
7,534,065 B2 * 5/2009 Rejman et al. ............. 403/106

* cited by examiner

*Primary Examiner*—Michael P Ferguson
(74) *Attorney, Agent, or Firm*—Michael J. Striker

(57) ABSTRACT

A battery pack with a device for locking said battery pack to a cordless power tool has a guide configured to guide the battery pack in a predetermined movement direction as it moves between a locking position in which it is locked to the cordless power tool and a removal position in which it is removed from the cordless power tool, the guide has a break in at least one location between the locking position and removal position, and at said location a force acting on the battery pack moves the battery pack into a safety position offset from the guide, in which the battery pack is prevented from moving further along the guide into the removal position.

12 Claims, 3 Drawing Sheets

BATTERY PACK LOCKABLE WITH A CORDLESS POWER TOOL

CROSS-REFERENCE TO RELATED APPLICATION

This application claims the benefit of priority of U.S. patent application Ser. No. 11/220,107 filed Sep. 6, 2005 under 35 USC 119(e). The subject matter of the aforesaid U.S. patent application is explicitly incorporated herein by reference thereto.

The invention described and claimed hereinbelow is also described in German Patent Application DE 10 2004 044 331.9 filed on Sep. 9, 2004. This German Patent Application provides the basis for a claim of priority of invention under 35 U.S.C. 119(a)-(d).

BACKGROUND OF THE INVENTION

The present invention relates to a battery pack lockable to a cordless power tool by a locking device.

Locking devices of this type are used, for example, to reliably connect cordless hand-guided power tools to a battery pack used as a power supply.

The known locking devices usually have a linear guide provided on the power tool into which the battery pack is slid until, after being slid all the way in, it comes into contact with a stop and is locked in this position in relation to the power tool, while simultaneously producing an electrical connection between a battery of the battery pack and an electrical circuit of a consumer of the power tool. The locking usually occurs with the aid of a latch, which is supported in a housing of the power tool so that it can move in opposition to the force of a spring and which the spring force brings into engagement with a detent recess in the battery pack. A release mechanism is used to release the connection and usually has a push button, which is situated in the region of the guide and is manually actuated in order to disengage the latch from the detent recess and release the battery pack. The battery pack is then slid along the guide into a removal position in which it no longer engages the cordless power tool.

Since the movement resistance while the battery pack is being slid into the guide of the power tool generally increases toward the end of the insertion path due to the increasing size of the friction surfaces and due to the contact between the electrical terminals, the user can be given the impression that the two components are properly locked in position although this is not yet the case. This can result in the battery pack slipping out of the guide during transport or operation of the power tool when the latter is tilted downward toward the removal position, which can lead to property damage or injury.

In order to prevent the battery pack from unintentionally detaching from the power tool, some of the applicant's larger and heavier power tools are already provided with a two-stage locking device called a double locking mechanism in which, as the battery pack is slid into the guide, the spring force of a spring-loaded latch brings it into engagement with two detent recesses provided in the battery pack, one after the other in the insertion direction. When the latch engages with the first detent recess, the battery pack is only secured in relation to the power tool, whereas an electrical connection is only produced when the latch engages in the second detent recess.

This does make it possible to prevent the battery pack from unintentionally detaching from the power tool when the latch is not engaging in the second detent recess or is not properly engaging in it, for example because the user has not slid the battery pack all the way into the locking position in the guide. But if the user does not hold the battery pack while actuating the release mechanism and the guide is simultaneously pointing obliquely downward from the locking position, then even a two-stage locking mechanism is unable to reliably prevent the battery pack from falling out.

SUMMARY OF THE INVENTION

Accordingly, it is an object of the present invention to provide a battery pack and a cordless power tool lockable with one another, which avoid the disadvantages of the prior art.

In keeping with these objects and with others which will become apparent hereinafter, one feature of the present invention resides, briefly stated, in a battery pack comprising a device for locking said battery pack to a cordless power tool, comprising a guide configured to guide the battery pack in a predetermined movement direction as it moves between a locking position in which it is locked to the cordless power tool and a removal position in which it is removed from the cordless power tool, said guide having a break in at least one location between the locking position and removal position, and at said location a force acting on the battery pack moves the battery pack into a safety position offset from said guide, in which the battery pack is prevented from moving further along said guide into the removal position.

Another feature of the present invention resides in a cordless power tool comprising a device for locking said cordless power tool to a battery pack, comprising a guide configured to guide the battery pack in a predetermined movement direction as it moves between a locking position in which it is locked to said cordless power tool and a removal position in which it is removed from said cordless power tool, said guide having a break in at least one location between the locking position and removal position, and at said location a force acting on the battery pack moves the battery pack into a safety position offset from said guide, in which the battery pack is prevented from moving further along said guide into the removal position.

When the battery pack and the cordless power tool are designed in accordance with the present invention, it has the advantage over the prior art that in locking mechanisms with either a one-stage or a two-stage locking action, the battery pack can be prevented from uncontrollably dropping out of the guide if the user is not holding it or is not holding it correctly when the guide is tilted downward and the release mechanism is intentionally or unintentionally actuated.

The present invention is based on the idea that the battery pack locked to the power tool after being unlocked and while being moved along the guide out of the locking position and into the removal position, is forcibly deflected into a safety position offset from the guide by means of the break in the guide and the force exerted at this location, and in the safety position, the battery pack is secured in relation to the cordless power tool until the user grasps it and disengages it from the safety position again, in opposition to the exerted force, in order to then slide it along the guide until it travels all the way into the removal position.

Since battery packs are usually removed while power tools are being held in their normal operating position in which the battery pack is pointing downward, the force acting on the battery pack can easily be exerted by the weight of the battery pack if its center of gravity is lower in the safety position than during its movement along the guide and gravity consequently pulls the battery pack downward into the safety position. But since this orientation is not necessarily always maintained and could also be different in other cordless power tools, in a preferred embodiment of the present invention, the force acting on the battery pack is a spring force that pushes or pulls the battery pack into the safety position and has the advantage over gravity that it works regardless of the spatial orientation of the components.

In another preferred embodiment of the present invention, the spring acts on the battery pack essentially transversely to the movement direction of the battery pack in the guide in order to move the battery pack directly and without deflection of the force direction, into the safety position, in a direction transverse to its movement path in the guide. Even when a spring is used to generate the force required, it is preferable for the safety position to be offset downward in relation to the movement path of the battery pack in the guide in order to provide a redundancy by means of the battery pack's weight acting on it in the same direction as the force of the spring during the movement of the battery pack into the safety position.

Alternatively, however, the spring can also act on the battery pack essentially in its movement direction in order, after the unlocking, to slide it along the guide in the direction of the removal position until, in the break region, the battery pack engages with a suitable guide surface that moves the battery pack, through the action of the spring force and preferably also through the action of its weight, out of the movement path along the guide and into the safety position.

According to another preferred embodiment of the present invention, the cordless power tool and the battery pack are adapted to each other so that in the safety position, the battery pack is in fact prevented from moving toward the removal position, but is able to freely move in the opposite direction toward the locking position so that when being attached to the cordless power tool, the battery pack can be moved freely all the way into the locking position, even if it is moved into the safety position in the meantime because the user is not holding it correctly. This is preferably achieved by means of the fact that the battery pack and the cordless power tool are provided with cooperating stop surfaces at one end and are provided with cooperating leading bevels at the other; in the safety position, the stop surfaces are situated opposite one another in the removal direction and prevent the battery pack from being moved further toward the removal position, while the leading bevels are situated opposite from one another in the locking direction and cause the battery pack to be automatically pushed back out of the safety position when the force acting on it has moved it into the safety position while it is being slid into the locking position.

In order to provide for a perceptible movement into the safety position in the break region and to simultaneously provide an essentially play-free guided relative movement between the battery pack and the cordless power tool in the guide both before and after the break, the guide on the battery pack and on the cordless power tool preferably has alternating projections and recesses; in the region of the break, at least part of the projections engage in the opposing recesses and before and after the break, the respective projections rest against one another with opposing guide surfaces.

As in conventional locking mechanisms of power tools and battery packs, the guide is suitably embodied in the form of a linear guide that guides the battery pack on a straight movement path until the break in the guide, where the force exerted on the battery pack causes it to leave the movement path and move into the safety position. Alternatively, however, the guide could also be embodied in the form of a curved guide so that the battery pack is attached to and detached from the cordless power tool, for example by means of a rotating motion; the safety position is suitably offset in relation to the rotation direction, in the direction that the force is exerted.

The novel features which are considered as characteristic for the present invention are set forth in particular in the appended claims. the invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
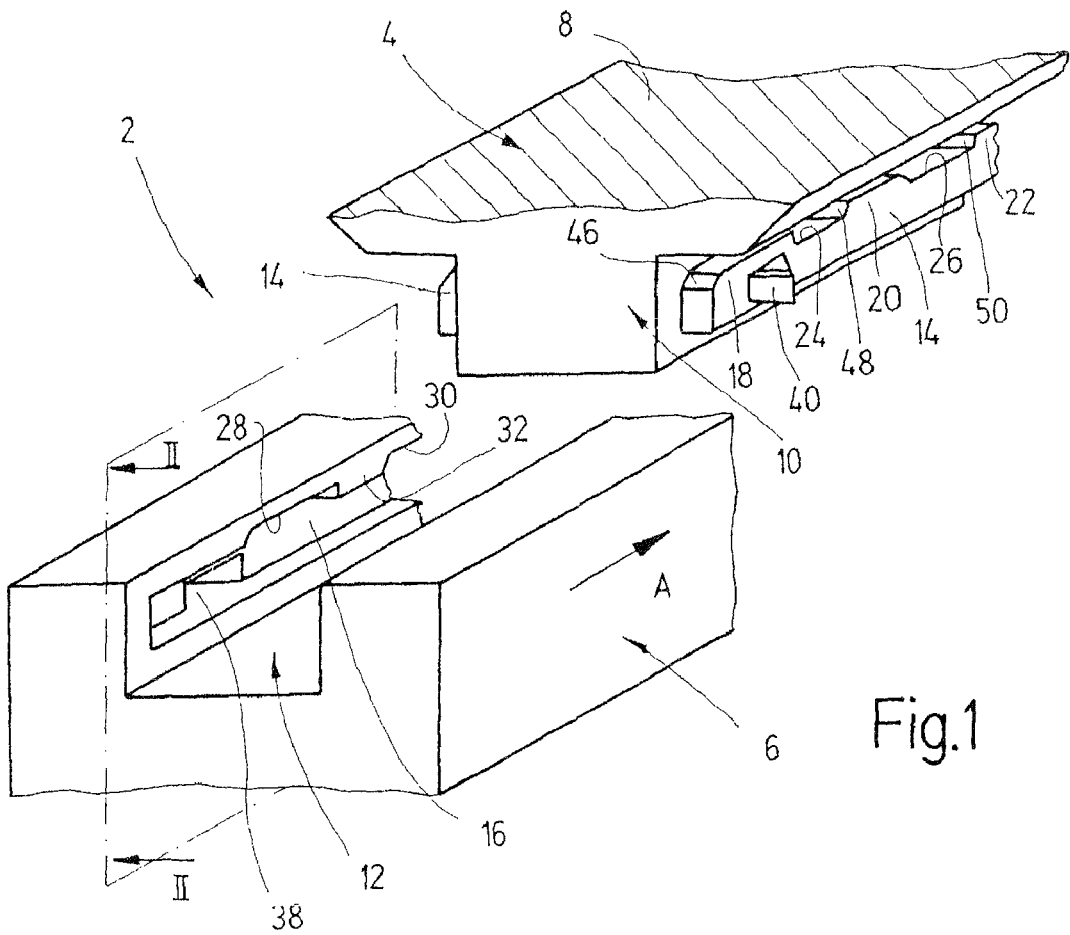
FIG. 1 is a partially cutaway perspective view of a first embodiment form of a locking device for locking a power tool to a battery pack.

The locking devices 2 shown in the drawings are used to lock a cordless power tool 4, for example a hand-guided percussion drill, to a battery pack 6 required to supply power to the power tool 4.

As best shown in FIGS. 1 through 5, on the free lower end of its handle 8, the power tool 4 is provided in a known fashion with a protruding guide rail 10 that can be slid in the direction of the arrow A into a guide groove 12 let into the upper end of the battery pack 6. This guide groove 12 has a cross section complementary to the cross section of the guide rail 10 and, together with it, constitutes a linear guide that defines the predetermined insertion direction (arrow A).

The guide rail 10 is provided with two laterally protruding guide strips 14, whose cross sections essentially correspond to the cross sections of two guide slots 16 (only one of which is visible in FIG. 1) situated opposite from each other inside the guide groove 12. The tops of the two guide strips 14 are each composed of three projections 18, 20, 22 with flush, flat tops situated one after the other in the longitudinal direction, between which elongated recesses 94 and 26 are provided.

When the guide rail 10 is inserted into the guide groove 12, the two guide strips 14 engage with the guide slots 16, whose upper limit surfaces facing the tops of the guide strips 14 are provided with two elongated recesses 28, 30 situated spaced apart from one another in the longitudinal direction, while before, between, and after the recesses 28, 30, the guide slots 16 extend parallel to the tops of the projections 18, 20, 22 of the associated guide strips 14. The foremost projection 18 of each guide strip 14 in the insertion direction is sized so that it fits in the hindmost recess 28, while a protrusion 32 between the recesses 28, 30 is sized so that it fits into the recess 24 between the foremost projection 18 and the subsequent projection 20.

Figure 2:
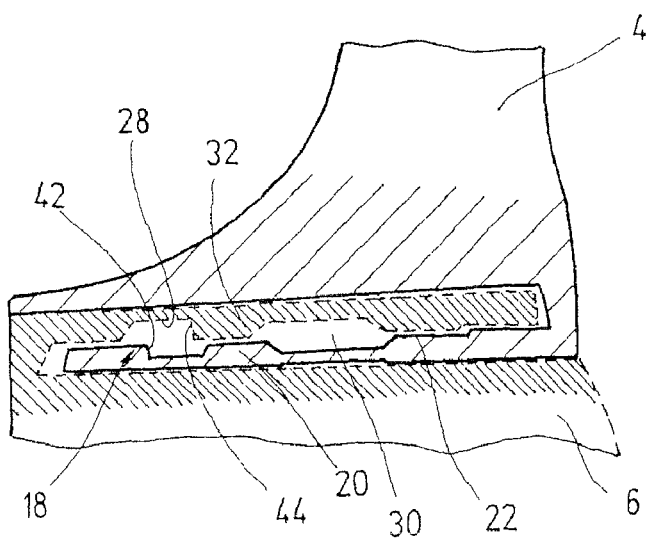
FIG. 2 is a cutaway view of the device from FIG. 1, cut along the plane II-II, which shows the battery pack in a locking position.

The insertion movement of the guide rail 10 into the guide groove 12 is limited by means of cooperating stops 34, 36 (see FIGS. 3 and 4), which are situated at the rear ends of the guide rail 10 and guide groove 12 in the insertion direction and rest against each other when the battery pack 6 is properly locked to the power tool 4 in its locking position depicted in FIG. 2 and an electrical connection is produced between the terminals of a storage battery of the battery pack 6 and an electrical circuit of a consumer of the power tool 4.

As best shown in FIG. 1, the locking device 2, in an intrinsically known manner, has two latches 40 (only one of which is visible), which can be moved in a spring-loaded fashion symmetrical to a vertical central plane of the guide rail 10, in a transversely extending latch guide and, with their opposing ends, protrude beyond adjacent lateral guide surfaces of the guide strips 14. When the battery pack 6 is locked to the power tool 4, the end surfaces of the latches 14 each engage in opposing detent recesses 38 (only one of which is visible) on the inside of the guide groove 12 of the battery pack 6. In a likewise intrinsically known manner, the locking device 2 has a release mechanism (not shown), which can be manually actuated to disengage the latches 14 from the detent recesses 38 in order to release the battery pack 6.

The locking device 2 can be designed for a one-stage or two-stage locking action; in the latter case, two additional detent recesses (not shown) are provided before the detent recesses 38 in the insertion direction in order to accommodate the latches to secure the battery pack 6 to the power tool 4 without an electrical connection being produced between the terminals of the storage battery of the battery pack 6 and the electrical circuit of the consumer of the power tool 4. This connection is produced when the battery pack 6 reaches the position shown in FIG. 2.

Figure 4:
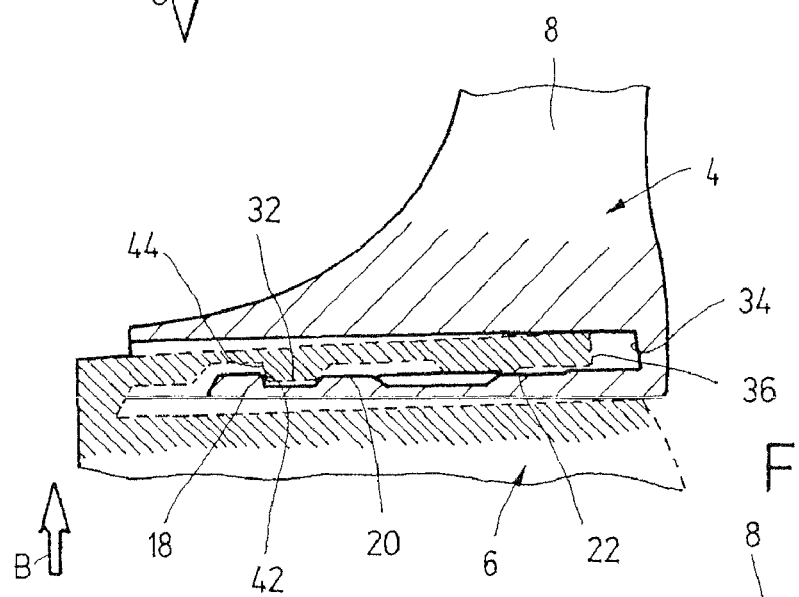
FIG. 4 is a view corresponding to FIG. 2, which shows the battery pack in a subsequently assumed safety position.
Figure 5:
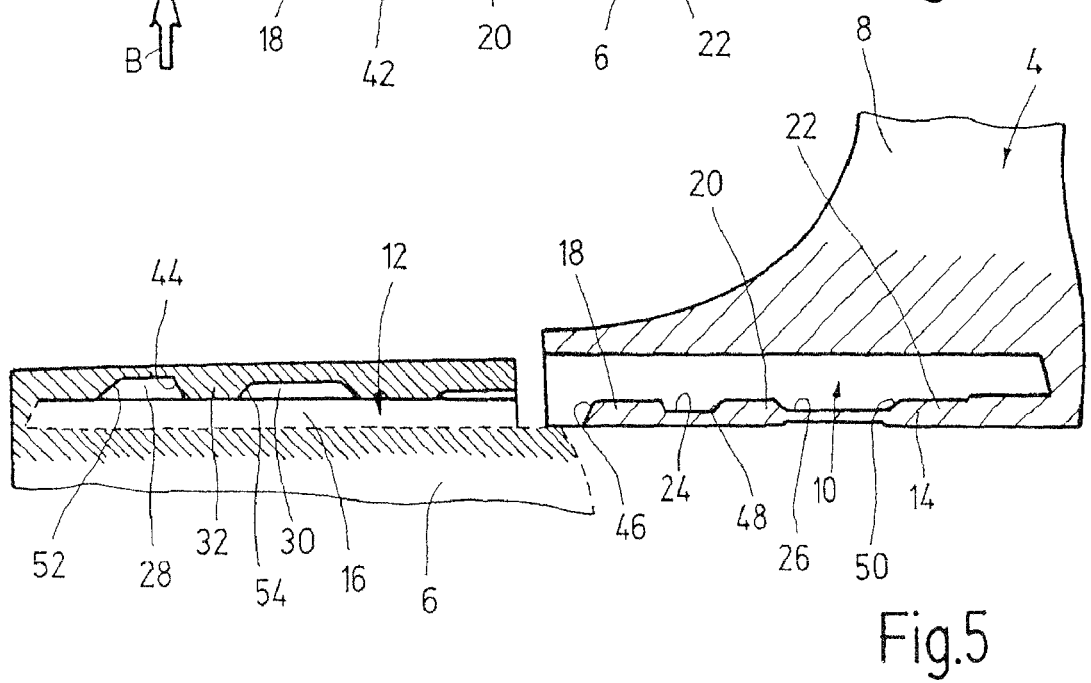
FIG. 5 is a view corresponding to FIG. 2, which shows the battery pack after removal from the power tool, in a removal position.

To prevent the battery pack 6 from sliding off of the guide rail 10 if the latter is tilted downward counter to the insertion direction (arrow A) and the release mechanism is intentionally or unintentionally actuated without the battery pack 6 being grasped, the guide 10, 12 has a break between the locking position and the removal position, which makes it possible to deflect the battery pack 6 out of its linear movement path between the locking position shown in FIG. 2 and the removal position shown in FIG. 5, transversely in relation to the guide 10, 12, into a safety position shown in FIG. 4, in which it is prevented from moving further toward the removal position.

Figure 3:
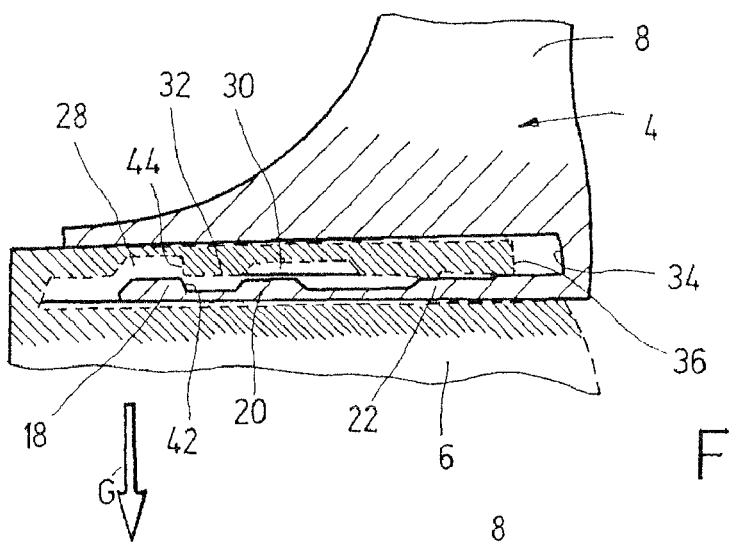
FIG. 3 is a view corresponding to FIG. 2, which shows the battery pack during removal from the power tool as it reaches a break in a guide of the locking device.

The break of the guide 10, 12 is situated at the point in the movement path of the battery pack 6 at which the projections 18 and 20 on the tops of the guide strips 14 are situated opposite the recesses 28 and 30 in the upper limit surfaces of the guide slots 16 and the protrusions 32 in the upper limit surfaces of the guide slots 16 are situated opposite the recesses 24 in the tops of the guide strips 14, as shown in FIG. 3. In this position, the weight of the battery pack 6 pulls it downward (arrow G), causing the projections 18 and 20 to engage in the recesses 28 and 30 and the protrusions 32 to engage in the recesses 24.

At their rear ends in the insertion direction, the projections 18 have stop surfaces 42 that are perpendicular to the insertion direction and, in the safety position, are situated opposite complementary stop surfaces 44 of the recesses 28 so that they prevent the battery pack 6 from moving further toward the removal position, as shown in FIG. 4. In order to disengage the battery pack 6 from the safety position for removal, it only needs to be lifted slightly in the direction of the arrow B and then moved again further in the guide 10, 12 until it reaches the removal position.

By contrast, at their front ends in the insertion direction, the projections 18, 20, and 22 are bounded by leading bevels 46, 48, 50, which in the safety position, are situated opposite complementary leading bevels 52, 54 of the recesses 28, 30. This allows the battery pack 6 to be slid unhindered into the locking position, even if it is not held correctly by the user and moves into the safety position as a result.

Figure 6:
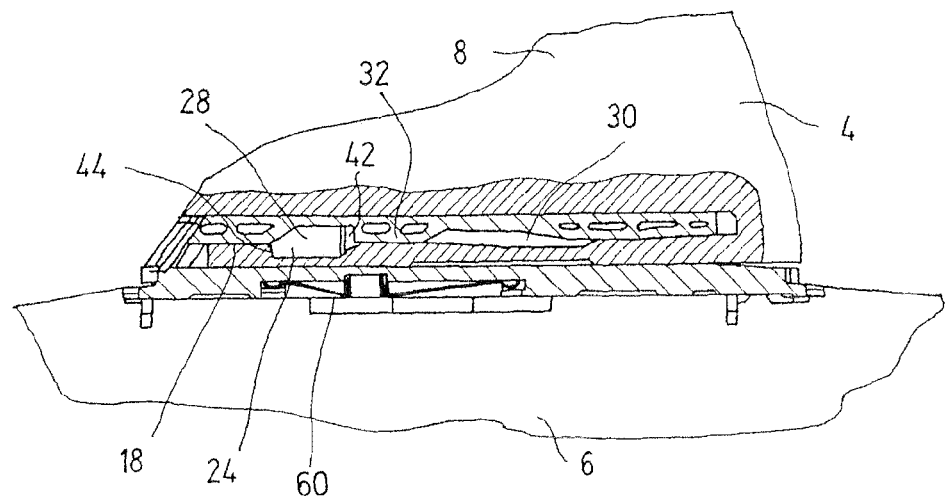
FIG. 6 is an enlarged cutaway side view of a second embodiment form of a locking device for locking a power tool and a battery pack together, which shows the battery pack in the locking position, as depicted in FIG. 2.
Figure 7:
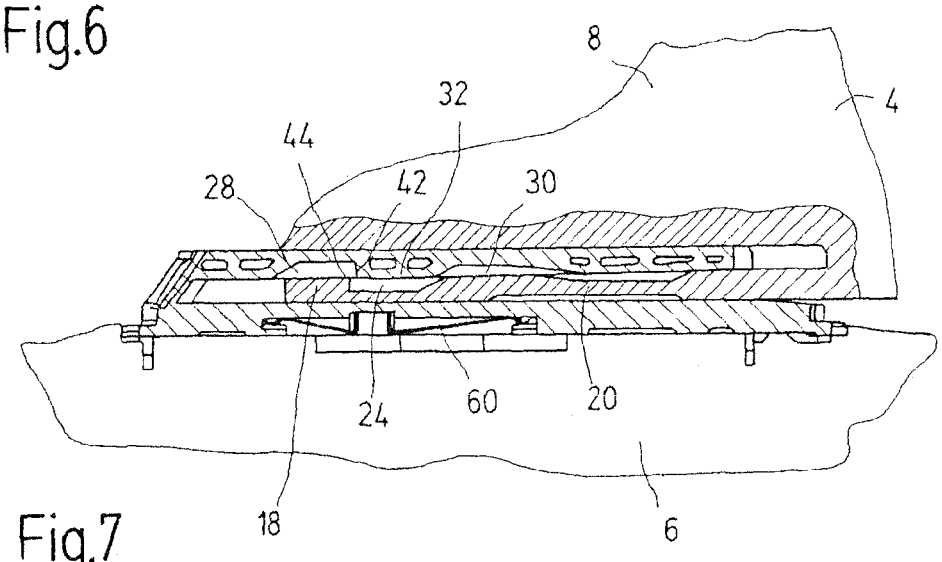
FIG. 7 is a view corresponding to FIG. 6, which shows the battery pack during removal from the power tool as it reaches a break in a guide of the locking device.
Figure 8:
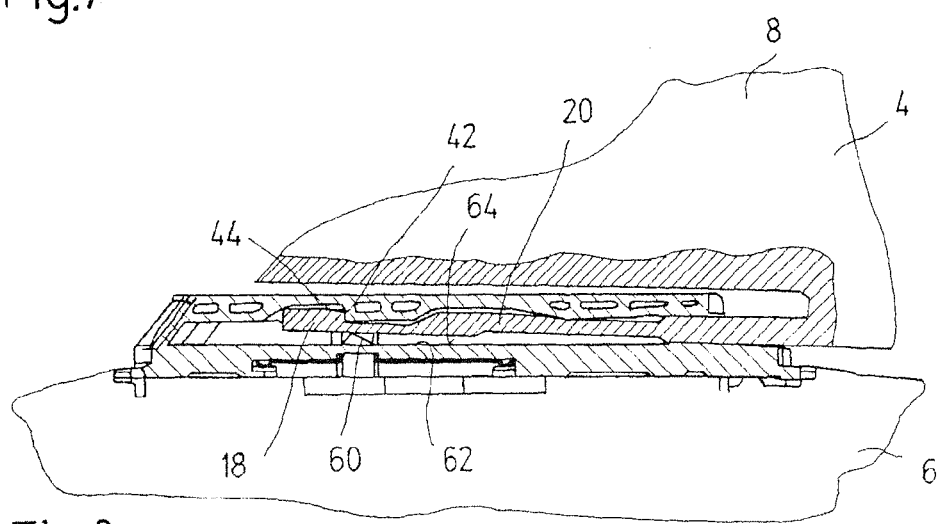
FIG. 8 is a view corresponding to FIG. 6, which shows the battery pack in a subsequently assumed safety position.

Whereas with the locking device 2 shown in FIGS. 1 through 5, the movement of the battery pack 6 into the safety position is initiated by the force of gravity on it, with the locking device 2 shown in FIGS. 6 through 8, two prestressed leaf springs 60 are also provided in order to tilt the battery pack 6 in relation to the power tool 4, into the safety position shown in FIG. 8 when it reaches the break in the guide 10, 12 (FIG. 7). The leaf springs 60 are inserted into the battery pack 6 underneath the guide slots 16 so that they press from underneath against the underside of the adjacent guide strips 14 and press the adjacent guide surfaces 62, 64 of the guide groove 12 and guide rail 10 apart from each other when the break in the guide 10, 12 is reached. The projections 18 are brought into engagement with the recesses 28 and the protrusions 32 are brought into engagement with the recesses 24 as described above.

It will be understood that each of the elements described above, or two or more together, may also find a useful application in other types of constructions differing from the types described above.

While the invention has been illustrated and described as embodied in a device for locking an cordless power tool to an battery pack, it is not intended to be limited to the details shown, since various modifications and structural changes may be made without departing in any way from the spirit of the present invention.

Without further analysis, the foregoing will reveal fully reveal the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims:

1. A system comprising a battery pack, a cordless power tool, and a device for locking said battery pack to said cordless power tool, the system comprising:
   a guide comprising a linear guide strip disposed on the cordless power tool and a linear guide slot disposed on the battery pack, the guide strip being slidably received within the guide slot and configured to guide the battery pack in a predetermined longitudinal movement direction as the battery pack moves between a locking position in which the guide strip is locked within the guide slot to lock the battery pack to the cordless power tool and a removal position in which the guide strip is removed from the guide slot to remove the battery pack from the cordless power tool; and
   at least one detent recess disposed on the battery pack and at least one mating latch disposed on the power tool, wherein in the locking position, the latch is brought into engagement with the detent recess to lock the battery pack to the cordless power tool, and wherein the latch in released from the detent recess to allow the battery pack to be moved to the removal position;

said guide further comprising a break formed by at least one transverse projection or recess on or in the guide strip, respectively, in at least one location along the longitudinal length of the guide strip, such that when the battery pack moves from the locking position towards the removal position, at said location a force acting on the battery pack moves the guide strip within the guide slot transversely to said longitudinal direction into a safety position, in which said projection or recess in said guide strip engages a mating transverse recess or projection in the guide slot such that the guide strip is prevented from moving further along said guide slot into the removal position.

2. A system as defined in claim 1, wherein the force acting on the battery pack in said location is a weight of the battery pack.

3. A system as defined in claim 1; and further comprising a spring arranged within said guide slot so that the force acting on the battery pack is a force of said spring.

4. A system as defined in claim 3, wherein said spring is arranged so that the spring acts on said battery pack and on the power tool essentially transversely in relation to a movement direction of the battery pack into the removal position.

5. A system as defined in claim 1; and further comprising stop surfaces provided within the guide slot of the battery pack and on the guide strip of the cordless power tool, situated opposite to one another in the safety position, and preventing the battery pack from moving further into the removal position.

6. A system as defined in claim 1; and further comprising leading bevels provided within the guide slot of the battery pack and on the guide strip of the cordless power tool, situated opposite to one another in said safety position, and permitting the battery pack to move into the locking position.

7. A cordless power tool comprising a device locking said cordless power tool to a battery pack, said device comprising:

a guide comprising a linear guide strip disposed on the cordless power tool and a linear guide slot disposed on the battery pack, the guide strip being slidably received within the guide slot and configured to guide the battery pack in a predetermined longitudinal movement direction as the battery pack moves between a locking position in which the guide strip is locked within the guide slot to lock the battery pack to the cordless power tool and a removal position in which the guide strip is removed from the guide slot to remove the battery pack from the cordless power tool; and at least one detent recess disposed on the battery pack and at least one mating latch disposed on the power tool, wherein in the locking position, the latch is brought into engagement with the detent recess to lock the battery pack to the cordless power tool, and wherein the latch in released from the detent recess to allow the battery pack to be moved to the removal position;

said guide further comprising a break formed by at least one transverse projection or recess on or in the guide strip, respectively, in at least one location along the longitudinal length of the guide strip, such that when the battery pack moves from the locking position towards the removal position, at said location a force acting on the battery pack moves the guide strip within the guide slot transversely to said longitudinal direction into a safety position, in which said projection or recess in said guide strip engages a mating transverse recess or projection in the guide slot such that the guide strip is prevented from moving further along said guide slot into the removal position.

8. A cordless power tool as defined in claim 7, wherein the force acting on the battery pack in said location is a weight of the battery pack.

9. A cordless power tool as defined in claim 7; and further comprising a spring arranged within said guide slot so that the force acting on the battery pack is a force of said spring.

10. A cordless power tool as defined in claim 9, wherein said spring is arranged so that the spring acts on said battery pack and on the power tool essentially transversely in relation to a movement direction of the battery pack into the removal position.

11. A cordless power tool as defined in claim 7; and further comprising stop surfaces provided within the guide slot of the battery pack and on the guide strip of the cordless power tool, situated opposite to one another in the safety position, and preventing the battery pack from moving further into the removal position.

12. A cordless power tool as defined in claim 7; and further comprising leading bevels provided within the guide slot of the battery pack and on the guide strip of the cordless power tool and situated opposite to one another in said safety position and permitting the battery pack to move into the locking position.

* * * * *